Figure 1:
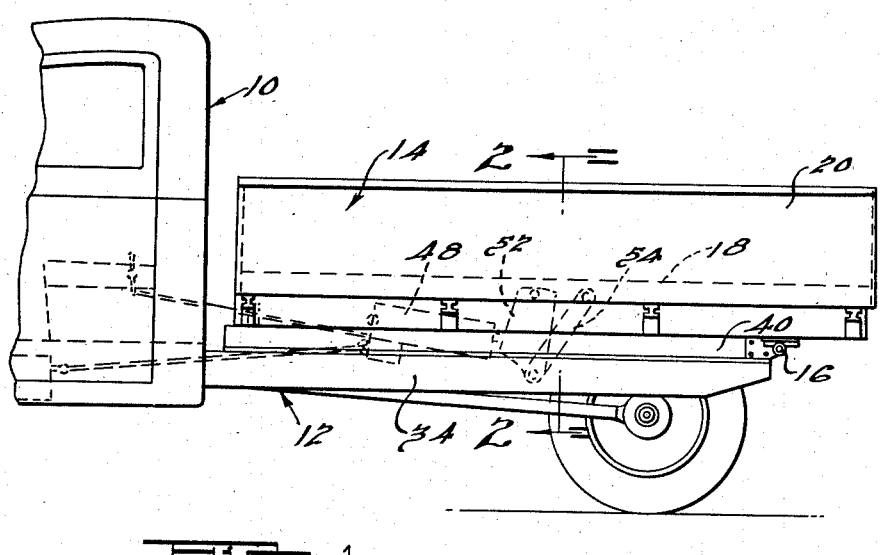

Dec. 30, 1941.  P. L. GLEASON  2,268,198
DUMP BODY
Filed Jan. 9, 1941

INVENTOR
Paul L. Gleason.
BY
Harness, Dickey & Pierce.
ATTORNEYS

Patented Dec. 30, 1941

2,268,198

UNITED STATES PATENT OFFICE 2,268,198

DUMP BODY

Paul L. Gleason, Decatur, Ga., assignor to Gar Wood Industries, Inc., Detroit, Mich., a corporation of Michigan Application January 9, 1941, Serial No. 373,743

4 Claims. (Cl. 298—22)

The present invention relates to dump truck constructions having a dump body mounted for tilting movement with respect to the truck chassis.

One of the primary objects of the present invention is to provide a low mount, dump truck construction having a lowered loading height, as compared to prior constructions, in which the construction is such that the loading capacity is not materially reduced.

Another object of the invention is to provide a low mount, dump truck construction in which the floor of the body has side portions at a lower level than the central portion, so that the loading height is relatively low and so that the power hoisting means may be disposed within the raised central portion to maintain the low mount.

Other objects of the invention will become apparent from the following specification, the drawing relating thereto and from the claims hereinafter set forth.

Figure 2:
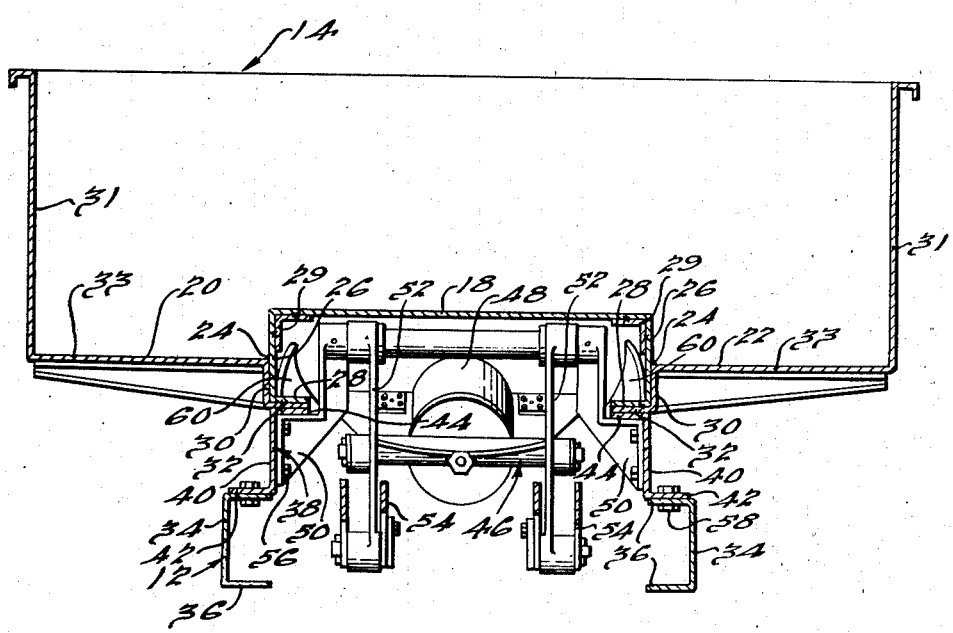

In the drawing, in which like numerals are used to designate like parts in the several views throughout:

Figure 1 is a partial, side elevational view of a dump truck constructed according to the present invention; and Fig. 2 is an enlarged, cross-sectional view taken substantially along the line 2—2 of Fig. 1.

Present day demands in dump trucks of the type to which the present invention is directed, require relatively low body mounts, which requirement introduces difficult construction problems. It is further desirable to have as low a loading height as possible without sacrificing body capacity, so that time and effort in loading are conserved. Also, the relationship between the body, the sub-frame and the chassis must be such that adequate hoisting mechanism may be mounted thereon in order to obtain the desired lift. The construction of the present invention permits this provision of adequate hoisting mechanism and, at the same time, permits the relatively low loading height without any material reduction in the body capacity.

Referring to the drawing, a dump truck is generally indicated at 10 having a chassis generally indicated at 12 and a body generally indicated at 14 pivotally mounted with respect to the chassis about transversely aligned pivot pins 16 located adjacent the rear end of the chassis.

The body 14 is formed of three main sections, namely, a longitudinally extending central section 18 and oppositely disposed side sections 20 and 22. Such sections are formed of sheet metal and are welded together as indicated at 24.

The central section 18 has depending side portions 26 extending longitudinally thereof which terminate in inwardly turned flanges 28. Longitudinally extending angle members 29 are disposed within the corners formed at the juncture of the depending portions 24 with the horizontal floor portion of the central section 18, and are welded thereto to provide rugged corners.

Each of the side sections 20 and 22 has depending portions 30 along the inner edges thereof, which terminate in inwardly disposed flanges 32. Such flanges 32 bear against the undersurfaces of inturned flanges 28 so that a strong construction is provided therealong. Each of the side portions 20 and 22 have upstanding sides 31 and substantially horizontal floor portions 33; and it will be seen that the portions 26 are of greater depth than the portions 30, so that when the elements are joined as shown, the floor portions 33 are disposed at a lower level than the horizontal floor portion of central section 18. For a body of a given depth, it will be appreciated that the top edge of the sides is in a relatively lower position with respect to the ground in the construction of the present invention so that the loading height is thereby reduced.

A front end plate and a conventional tail gate are also secured to the front and rear ends of the body, having top edges which terminate at the same height as the height of the sides 31.

The chassis 12 includes longitudinally extending side members 34 which are of channel section, thereby providing top and bottom inwardly disposed flanges 36.

A hoist sub-frame, generally indicated at 38, is mounted on the chassis 12 and is fixed thereto. Such sub-frame 38 includes longitudinally extending sill members 40 of Z cross-section, thereby providing outwardly disposed bottom flanges 42 and inwardly disposed top flanges 44. The frame 38 is substantially co-extensive with the rear carrying portion of the chassis 12, and also includes transversely extending bracing members (not shown) so that a rugged and rigid frame is provided.

A hoisting mechanism generally indicated at 48 is provided which is mounted on the sub-frame 38 and is connected to the body so that upon actuation of the housing mechanism the body is tilted with respect to the chassis and with respect to the sub-frame 38, about pivots 16. The hoisting mechanism 46 may be of conventional construction, but preferably is of the construction disclosed and claimed in the copending application of Edward R. Barrett, Serial No. 308,304, filed December 8, 1939, now Patent No. 2,234,134.

Such hoisting mechanism includes a cylinder 48 connected to the sub-frame 38 by means of brackets 50, connected to the sub-frame through linkage means 52, which in turn are connected to the body through linkage means 54. The piston within the cylinder is hydraulically actuated by means of a pump which may be connected to the power take-off of the engine through a flexible drive shaft with an operating lever located in the cab in the usual way.

The brackets 50 are connected to the longitudinal members 40 by suitable means such as bolts 56 having countersunk heads so that the outer surfaces of the members 40 are substantially smooth.

The sub-frame 38 having the hoisting mechanism mounted thereon may be mounted on the chassis 12 as a unit. The flanges 42 seat upon the upper flanges 36 of the longitudinal chassis members 34, and are suitably fixed thereto such as by bolts 58.

The flanges 28 and 32 overlie the flanges 44 so that when the body is in its lowered position the flanges 32 rest upon flanges 44.

In order to assist in guiding the body to its proper seat upon the sub-frame, cam members 60, having upwardly and inwardly disposed cam surfaces, are mounted to the flanges 44 of members 40 adjacent the front ends thereof. Portions of the flanges 28 and 32 are cut away adjacent the front ends thereof so that the members 60 may project upwardly therethrough. It will thus be seen that the cam surfaces of members 60 will abut against the inner faces of portions 26 to align the body with respect to the chassis as it is being lowered.

A low mount and a simple body hinge may be used in that adequate power hoisting mechanism may be so mounted on the sub-frame 38 that it is disposed within the space between the depending sides of the central body member 18.

Formal changes may be made in the specific embodiment of the invention described without departing from the spirit and substance of the invention, the scope of which is commensurate with the appended claims.

What is claimed is:

1. A vehicle body comprising a central member and oppositely disposed side members secured to said central member, the outer edges of said central member having integral depending portions extending therealong terminating along the bottom edges in inwardly disposed flanges, the inner edges of said side members having integral depending portions extending therealong terminating along the bottom edges in inwardly disposed flanges which bear against said first named flanges, the facing surfaces of the side members bearing against the adjacent faces, respectively, of the depending portions of the central member, said central member having a substantially horizontal floor portion, said side members having upstanding sides and substantially horizontal floor portions, the floor portions of the side members being disposed below the level of the floor portions of the central member.

2. A dump truck construction, comprising, in combination, a chassis having longitudinally extending frame members secured thereto, said members having inwardly disposed flanges along the top edge thereof, a body pivotally mounted with respect to said chassis, said body including a central member and oppositely disposed side members secured to said central member, the outer edges of said central member having integral depending portions extending therealong terminating along the bottom edges thereof in inwardly disposed flanges which are adapted to overlie said first named flanges, the inner edges of said side members having integral depending portions extending therealong, the facing surfaces of the depending portions of the side members bearing against the adjacent faces, respectively, of the depending portions of the central member, said central member having a substantially horizontal floor portion, said side members having upstanding sides and substantially horizontal floor portions, the floor portions of the side members being disposed below the level of the floor portions of the central member, and power hoisting means connected to said longitudinally extending frame members and disposed within the depending sides of the central member.

3. A dump truck construction comprising, in combination, a chassis having longitudinally extending frame members secured thereto, a body pivotally mounted on said frame members, said body including a central member and oppositely disposed side members secured to said central member, said central member having a substantially horizontal floor portion, said side members having upstanding sides and substantially horizontal floor portions, the floor portions of said side members being disposed below the level of the floor portions of said central member to provide a raised central portion on the under side of said body, and power hoisting means mounted on said chassis and extending within said raised central portion.

4. A dump truck construction comprising, in combination, a chassis having longitudinally extending frame members secured thereto, a body pivotally mounted on said frame members, said body including a central member and oppositely disposed side members secured to said central member, the outer edges of said central member having integral depending portions extending therealong terminating along the bottom edges in inwardly disposed flanges, the inner edges of said side members having integral depending portions extending therealong, the facing portions of said side members bearing against the adjacent faces, respectively, of the depending portions of the central member, said central member having a substantially horizontal floor portion, said side members having upstanding sides and substantially horizontal floor portions, the floor portions of said sides being disposed below the level of the floor portions of the central member, and power hoisting means mounted on said chassis and disposed within the integral depending portions of said central member.

PAUL L. GLEASON.